United States Patent [19]
Winston, Jr.

[11] Patent Number: 5,159,575
[45] Date of Patent: Oct. 27, 1992

[54] SINGLE STAGE DEMODULATOR WITH REFERENCE SIGNAL PHASE DITHER

[76] Inventor: Charles R. Winston, Jr., 254 E. Hartland Rd., North Canton, Conn. 06059

[21] Appl. No.: 546,819

[22] Filed: Jul. 2, 1990

[51] Int. Cl.$^5$ .............................................. G01C 19/72
[52] U.S. Cl. .................................................. 356/350
[58] Field of Search .............................. 356/350, 345; 250/227.27; 372/94

[56] References Cited

U.S. PATENT DOCUMENTS 4,871,254 10/1989 Lefevre et al. ..................... 356/350

*Primary Examiner*—Samuel Turner
*Assistant Examiner*—Richard Kurtz

[57] ABSTRACT

A fiber optic rotation sensor includes a fiber optic coil with light beams counterpropagating therein where the beams are phase modulated with a squarewave carrier at the coil eigenfrequency. The beams recombine at the coil output with a resultant optical intensity which is a measure of the change in sensor rotation rate. The recombined signal also contains an error component due to squarewave carrier imperfections which cause high frequency spikes in the modulated rate signal resulting in rotational rate bias errors. The rotational rate bias errors are reduced by demodulating the modulated rate signal with a demodulator reference signal uniformly phase dithered about the carrier signal.

15 Claims, 7 Drawing Sheets

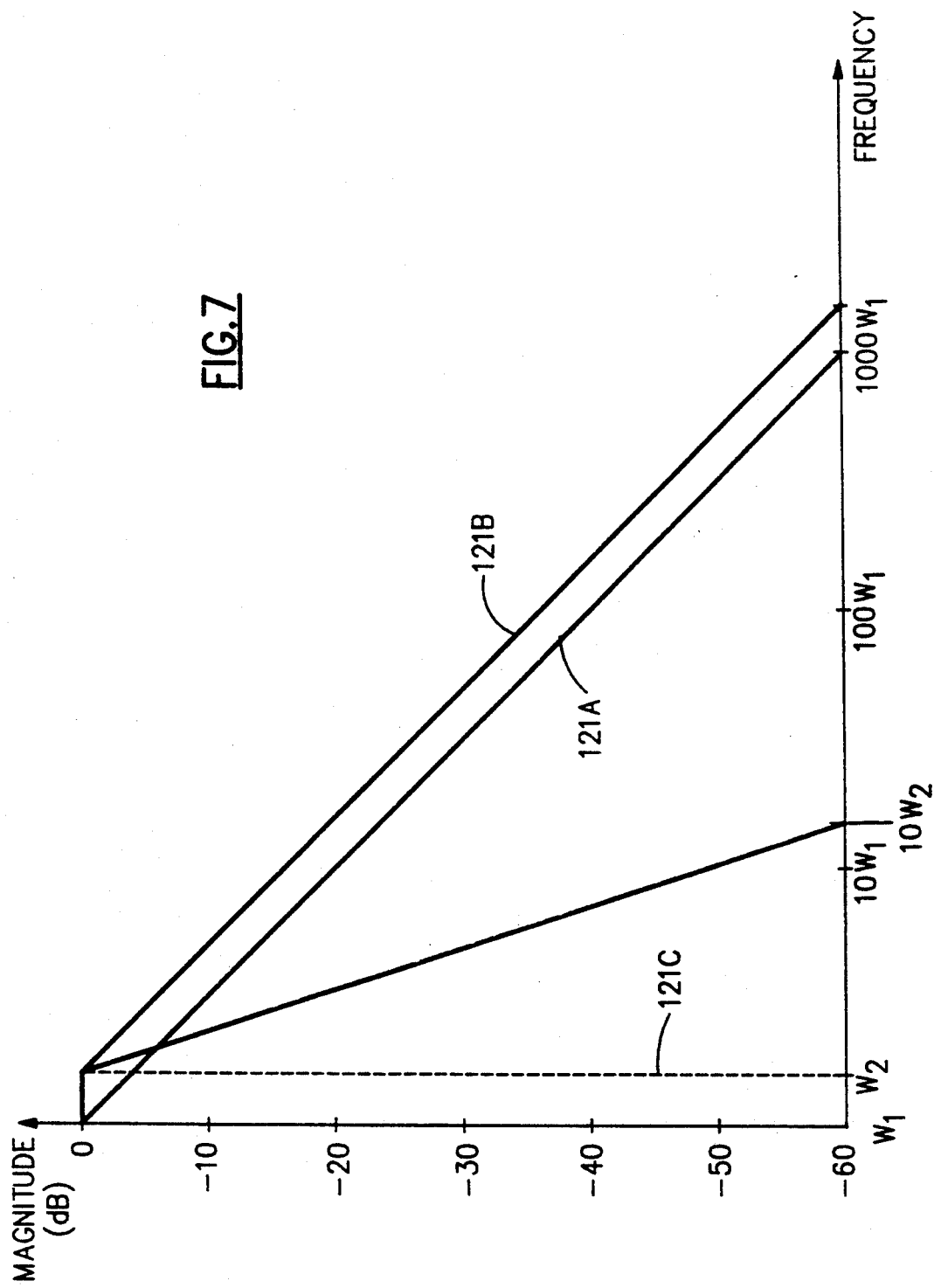

SINGLE STAGE DEMODULATOR WITH REFERENCE SIGNAL PHASE DITHER

DESCRIPTION

1. Technical Field

This invention relates to fiber optic rotation sensors, and more particularly to such sensors having the signal processing ability to reduce errors in the sensed rotation rate signal.

2. Background Art

A fiber optic rotation sensor is an interferometric device which operates on the Sagnac effect. The amount of phase shift between light beams counterpropagating in a fiber optic coil is directly proportional to the sensor's rotation rate. With zero rotation rate, the counterpropagating beams travel the same distance in the coil and are thus in phase at the output.

The intensity of the recombined light beams is proportional to the amount of phase shift detected at the coil output due to the phase relationship of the counterpropagating beams. Since the counter-propagating beams recombine in phase at zero rotation rate, intensity is a maximum due to the cosine characteristic of intensity as a function of phase shift. However, this cosine characteristic results in the sensor being relatively insensitive to small changes in rotation rate due to the small derivative of intensity with respect to phase shift in the area about the peak of the cosine curve.

To overcome the insensitivity, phase bias is added to the counterpropagating beams to shift the intensity curve so the zero rotation rate point is in an area of increased sensitivity. Typically this is done using either sinewave or squarewave phase modulation with the the carrier frequency equal to one half times the reciprocal of the coil transit time, ie. the eigenfrequency.

When a single stage demodulator is used to recover the rotational rate information in the phase modulated signal, a large AC gain in the amplifier prior to the demodulator is required to reduce the contribution of the DC electronic offsets to the system rate bias. That is, by amplifying the signal, the percent of error contributed by the DC electronic offsets can be reduced since the offset voltage is relatively unaffected by the increase in signal amplitude. This large gain requirement necessitates the use of squarewave phase modulation, which ideally generates a modulated rate signal without the large even harmonics of the eigenfrequency which are characteristic of sinewave modulation.

However, squarewave phase modulation has its own problems such as large and variable rate biases (ie. inaccuracies in the modulated rate signal) which are not apparent in systems that employ sinewave phase modulation. These bias terms result from imperfections of the squarewave, e.g., edges that do not fall in zero time, non 50% duty cycles, and/or a frequency not exactly at the eigenfrequency. These imperfections contribute unwanted spikes at twice the eigenfrequency in the modulated rate signal.

Ideally the spikes represent an error signal in quadrature (90 degrees out of phase) with the reference frequency which should be rejected by the phase sensitive demodulator if the reference signal is exactly in phase with the modulated rate signal. However, because the power of the error signal spikes is concentrated in such a narrow range, small errors in the phase alignment of the reference signal and the modulated rate signal may lead to total demodulation of these spikes. The magnitude and direction of the small phase errors caused by the spikes determines the magnitude and polarity of the rotational rate bias error, which may be significant.

Disclosure of Invention

An object of the present invention includes provisions for compensating for the rotational rate bias terms created due to imperfections of the eigenfrequency squarewave carrier signal.

According to the present invention, a fiber optic rotation sensor includes an optical waveguide loop with light beams counterpropagating therein, the beams being modulated with a periodic squarewave carrier at a certain frequency and recombined at the output of the coil, with a resultant optical intensity serving as a measure of the change in rotation rate, but also containing errors due to squarewave carrier imperfections, where demodulating the signal from the recombined beams with a reference signal uniformly phase dithered about a certain frequency signal, reduces the contribution to the rate bias error made by the hereinbefore mentioned squarewave imperfections thereby improving the rotation sensor's accuracy.

The present invention reduces errors in the modulated rate signal incurred due to the use of a squarewave carrier signal. This reduction allows a fiber optic rotation sensor to employ a single stage demodulator simplifying the signal processing of the modulated rate signal.

These and other objects, features and advantages of the present invention will become more apparent in light of the following detailed description of a best mode embodiment thereof as illustrated in the accompanying drawing.

BRIEF DESCRIPTION OF THE DRAWING

FIG. 7 is a graph of the Bode plots for an integrator, a slow first order lag and a slow third order lag with its three poles at the same frequency.

BEST MODE FOR CARRYING OUT THE INVENTION

Figure 1:
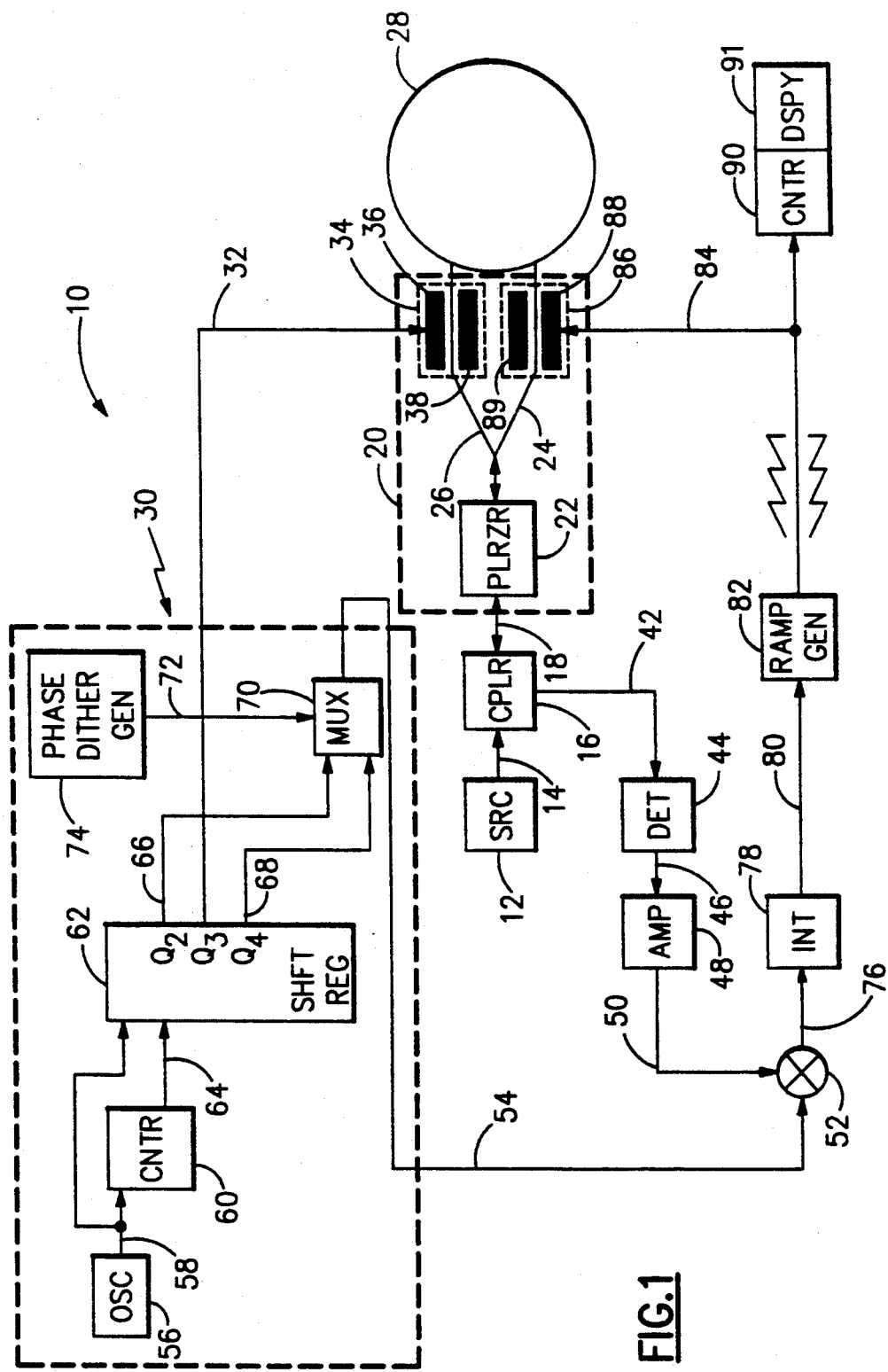
FIG. 1 is a block diagram of a fiber optic rotation sensor containing the apparatus of the present invention.

Referring to FIG. 1, a fiber optic rotation sensor 10, e.g. a fiber optic gyro (FOG), contains a light source 12 which emits a beam of low coherence light into an optical fiber 14. The light beam propagates to a known coupler 16 which typically has a coupling efficiency of approximately 50%, sending 50% of the light along an optical fiber 18 into an integrated optical (IO) device 20. Within the IO device the beam is input to a polarizer 22 to ensure FOG reciprocity. The beam is then split into two beams. Each beam travels through a corresponding waveguide 24,26 and exits the IO device to counterpropagate in a fiber optic coil 28. The coil 28 comprises, e.g., 150 meters of optical fiber wound on a cylindrical spool.

Operation of the FOG is based on the well known Sagnac effect where rotation of a coil about an axis perpendicular to the plane of the coil causes the counterpropagating beams within the coil to travel unequal distances and recombine out of phase at the output. The resulting phase difference is directly proportional to the FOG rotation rate.

Figure 2:
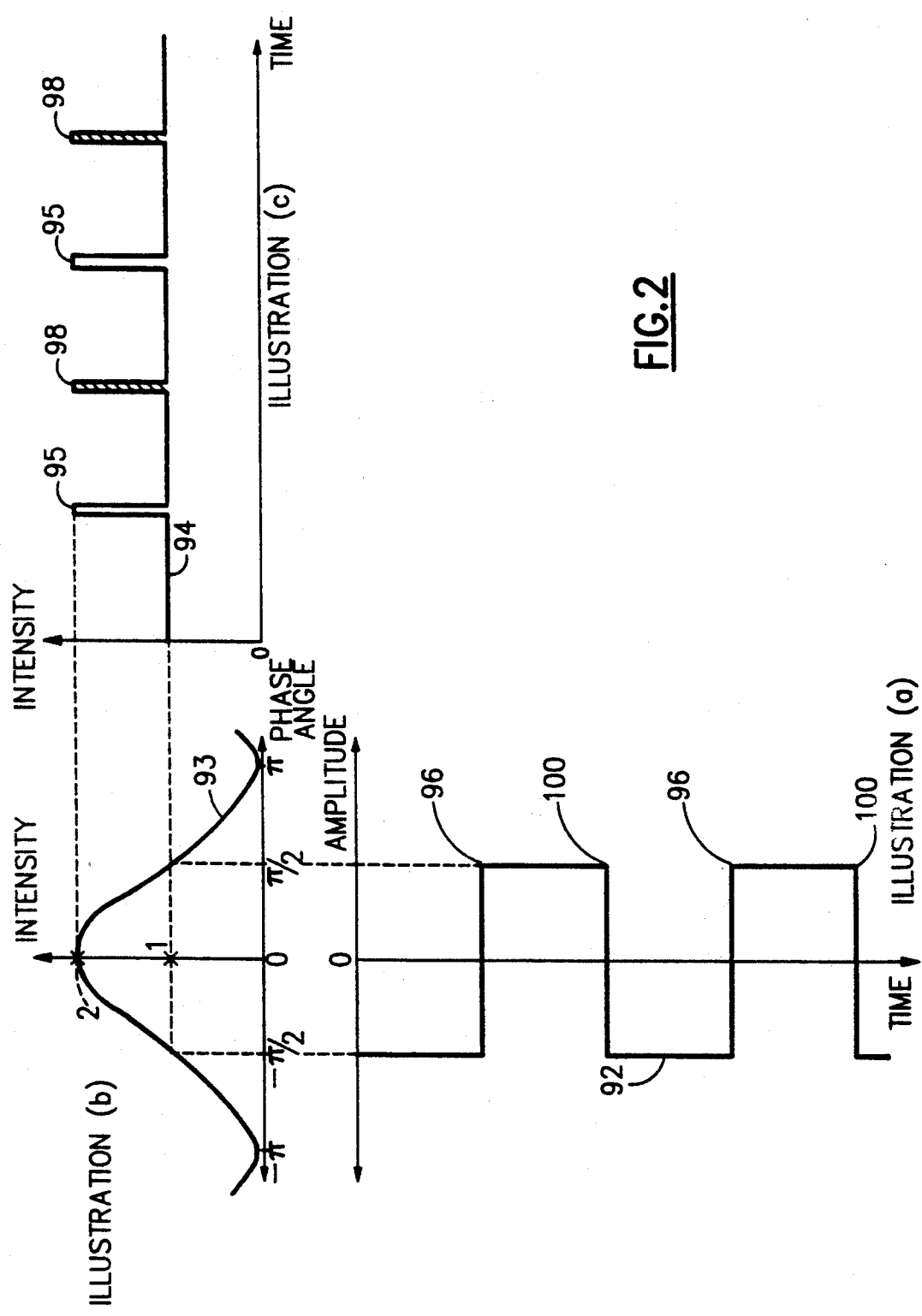
FIG. 2 is a graph of the intensity versus phase shift curve modulated by the squarewave carrier when there is no change in rotation rate.

Since the rotational rate information is based on the phase shift between the counterpropagating beams, the accuracy of the FOG is partially dependent upon the degree to which the optical path each beam travels can be made equal. The measure of equality along the paths is referred to as reciprocity. If reciprocity can be maintained then the recombined optical signal will have a maximum intensity when there no is rotational acceleration, since the counterpropagating beams recombined in phase. However, the sensitivity of the FOG to small changes in rotation rate is unsatisfactory due to the 1+cos(phi) characteristic of intensity as a function of phase shift illustrated in FIG. 2, illustration (b). Phi is the Sagnac phase shift caused by the rotation rate of the sensor. In a closed loop FOG phi represents the change of rotation rate, i.e. radians/sec$^2$, whereas in an open loop FOG phi represents rotation rate, i.e. radians/sec. As an example, the best mode embodiment shall discuss as one application of the present invention a closed loop phase nulling FOG.

To improve FOG sensitivity a dynamic phase bias is added to the counterpropagating beams, which effectively shifts the intensity curve. This dynamic phase bias is added to alternately operate the sensor with ±90 degrees of phase bias to realize maximum sensitivity to small changes in rotation rate. The phase bias may comprise either a sinewave or squarewave signal.

In accordance with an exemplary embodiment of the present invention, a squarewave bias signal at the coil eigenfrequency is generated by phase dither circuitry 30 on a line 32 to a dynamic bias modulator 34 fabricated on the IO device 20. The dynamic bias modulator 34 comprises a pair of electrodes 36,38 surrounding the waveguide 26. When excited by the squarewave bias signal, the dynamic bias modulator 34 phase modulates the light beam in the waveguide 26.

Following counterpropagation in the coil, the beams are recombined on the IO device 20 and pass through the polarizer 22. The recombined beam then exits the IO device and propagates in the fiber 18 to the coupler 16. A portion, e.g. typically 50%, of the recombined beam then exits the coupler and propagates through an optical fiber 42 to a detector 44, e.g. a PIN diode. The detector transforms the modulated optical signal to an AC voltage signal whose magnitude is proportional to optical intensity. The voltage signal is then fed on a line 46 to a high bandwidth amplifier 48 with a constant gain, which generates an amplified signal on a line 50 to a demodulator 52.

The reference signal for the demodulator on a line 54 is generated by the phase dither circuitry 30 in accordance with the present invention. An oscillator 56 generates a squarewave signal on a line 58 to a counter 60, e.g. Texas Instruments model 74LS163, and also to a shift register 62, e.g. Texas Instrument model 74LS164. The counter 60 divides the input signal on the line 58 down to the coil eigenfrequency and provides a signal indicative thereof on a line 64 to the shift register 62. The shift register, which is clocked by the oscillator output signal on the line 58, generates three output signals. One signal on the line 32 represents the eigenfrequency reference signal which serves as the carrier signal to the dynamic bias modulator 34. The other two signals on lines 66,68 are also at the eigenfrequency; however, a first signal on the line 66 is shifted from the eigenfrequency reference signal by one clock period to create phase lead, and a second signal on the line 68 is shifted by one clock period to create phase lag. These two phase shifted signals are fed to a multiplexer (mux) 70 e.g. a Texas Instruments model 74LS157.

The mux 70 is responsive to a two level (e.g. a squarewave) signal on a line 72 from a phase dither generator 74 in selecting one of the two signals on the lines 66,68 at the mux inputs to appear at the mux output on the line 54. The two level signal has zero mean (i.e. no DC) and may be either periodic or aperiodic. Such a signal could be created by bandpass filtering a white noise source with zero mean to provide a frequency spectrum which contains frequency components less than the eigenfrequency, but higher than the FOG's closed loop bandwidth. The mux output on the line 54 is fed to the demodulator 52, typically a Gilbert cell analog multiplier, and multiplied with the modulated rate signal on the line 50. Thus, rotational rate information is extracted from the modulated rate signal through demodulation using the mux output signal as the demodulator reference signal.

The demodulator output signal is fed on a line 76 to a known integrator 78 with gain. The integrator output is provided on a line 80 to a known ramp generator 82 which produces a linearly increasing bipolar ramp signal or a staircase signal on a line 84 to a serrodyne modulator 86 comprising a pair of electrodes 88,89 fabricated on the IO device 20 similar to the dynamic bias modulator 34 described hereinbefore. For this exemplary embodiment, a linear bipolar ramp signal shall be used. The rate and the polarity of the ramp signal on the line 84 is a function of the output signal from the integrator 78. When the magnitude of the ramp signal reaches the level held by a precision reference, the ramp voltage is quickly discharged to zero. The magnitude of the ramp voltage starts linearly increasing again creating a saw-tooth waveform which generates the phase bias to the counterpropagating beams within the coil 28. This phase bias nulls the rotation induced phase shift. The signal on the line 84 is also input to a counter 90 which counts the ramp frequency indicative of rotation rate for presentation on a display 91. It should be understood that in a broad sense, the display represents the device which will ultimately use the rotational rate information.

The FOG 10 is operating closed loop on optical phase shift to detect rotation rate. When the FOG is operating at a constant rotation rate, the amount of phase bias added by the serrodyne modulator 86 is also constant, i.e. steady state operation. However when the FOG undergoes a change in rotation rate, i.e. an acceleration, the amount of phase bias added no longer nulls out the phase shift induced by the new rotation rate. Therefore the new amount of phase bias to be added by the serrodyne modulator has to be determined.

When the FOG undergoes a change in rotation rate, the output of the amplifier 48 contains a frequency component at the eigenfrequency. The demodulation of this output signal generates a demodulated output on the line 76 whose frequency spectrum contains a DC component with a magnitude as a function of rotation rate. The demodulator output is then integrated and the rate and polarity of the ramp signal on the line 84 is set as a function of the integrator output magnitude in order to null out the phase shift induced by the new rotation rate. In effect the integrator is integrating a rotational acceleration term to get rotation rate, with the ramp generator providing the ramp signal necessary for the serrodyne modulator to null out the rotation induced phase shift.

The operation of the system is best understood by example. In FIG. 2 is illustrated the relationships among the signals on various lines of the FOG of FIG. 1 while the FOG is rotating at a constant rate. Waveform 92 (FIG. 2 illustration (a)) represents the squarewave carrier signal at the coil eigenfrequency on the line 32. When waveform 92 modulates the intensity waveform 93 (FIG. 2, illustration (b)), the result is waveform 94 (FIG. 2, illustration (c)). However, the squarewave carrier creates periodic spikes (FIG. 2, illustration (c)) at twice the eigenfrequency rate in the modulated rate signal. These spikes are caused by, e.g., imperfections in the positive and negative going edges of the carrier squarewave, and carrier signal harmonics and sidebands. The noncrosshatched spikes 95 result from the carrier's positive going edges 96, while the crosshatched spikes 98 result from the carrier's negative going edges 100.

Figure 3:
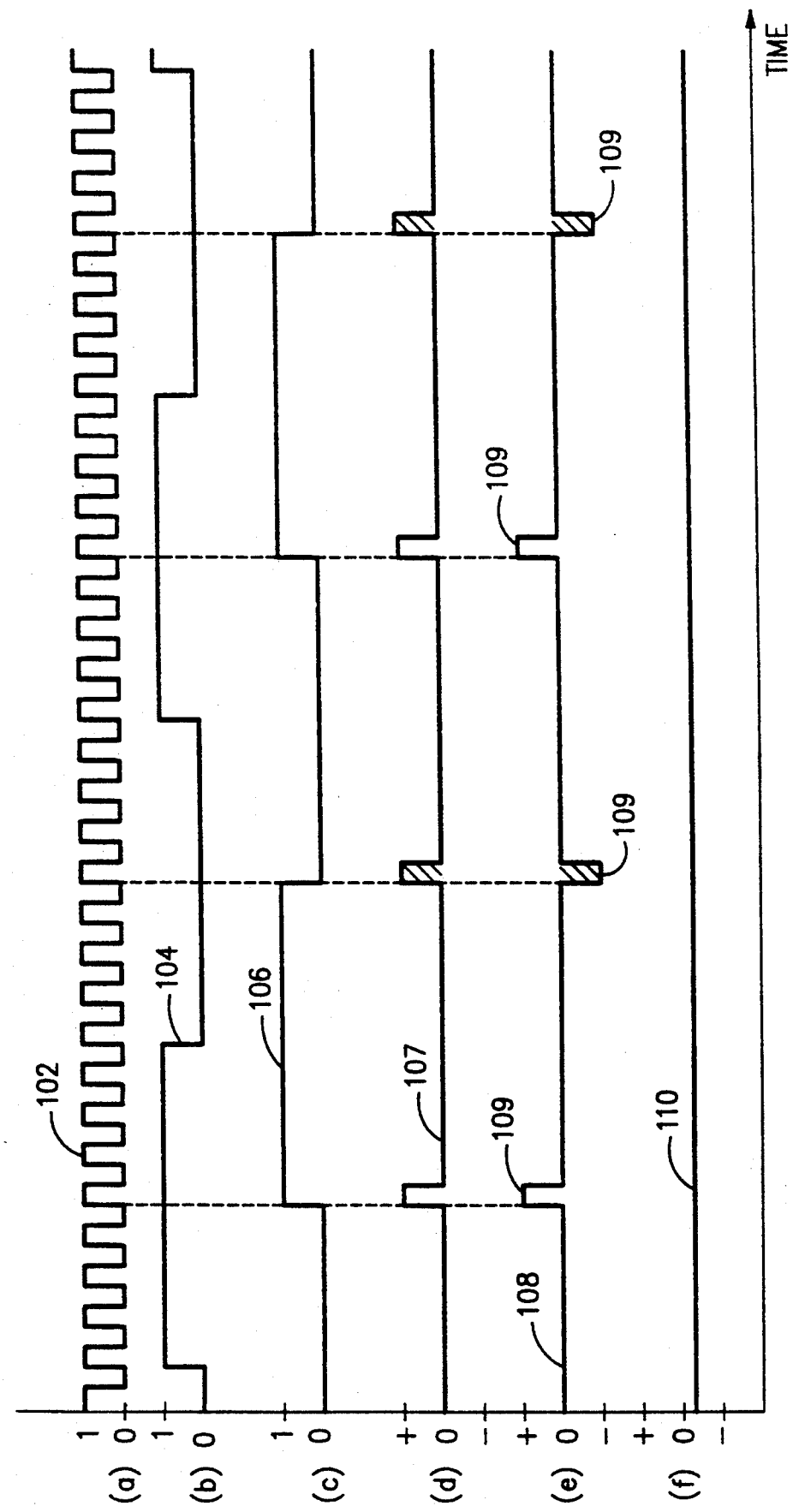
FIG. 3 is a timing diagram of select signals from FIG. 1 when there is no change in rotational rate and the phase dither technique is not being used in the signal processing.

In FIG. 3 is illustrated a timing diagram for the FOG rotating at a constant rate without the phase dither apparatus of the present invention operational to provide a phase dithered demodulator reference signal. Waveform 102 (FIG. 3, illustration (a)) represents the output of the oscillator 56 on the line 58. Waveform 104 (FIG. 3, illustration (b)) represents the output of the counter 60 on the line 64 operating at the coil eigenfrequency. The counter output is shifted several clock cycles by the shift register 62 and the resulting shift register output on the line 32 is illustrated by waveform 106 (FIG. 3, illustration (c)). Although not shown, but for exemplary purposes to illustrate a conventional FOG without the phase dithering apparatus of the present invention, assume the shift register output on the line 32 is applied to both the dynamic bias modulator 34 and the demodulator 52.

In FIG. 3, illustration (d), is illustrated a waveform 107 of the output signal of the amplifier 48 on the line 50. Note the amplifier output contains periodic spikes at a rate twice the eigenfrequency which occur at the edge transitions of the signal fed to the dynamic bias modulator, waveform 106. In the interest of clarity, waveforms 107 and 108 do not show the closed loop rate error signal resulting from the demodulation of the spikes. Waveform 108 (FIG. 3, illustration (e)) represents the demodulator output signal on the line 76. Since the area of the crosshatched and noncrosshatched spikes of waveform 108 may be unequal, integration results in a non-zero DC contribution to the integrator output. This additional DC signal represents a closed loop rate bias error and is shown by waveform 110 (FIG. 3, illustration (f)). Waveform 110 is illustrated as a negative DC signal under the assumption that the crosshatched area is greater than the noncrosshatched area.

In general, the demodulator translates the spectral components of the amplifier output about the coil eigenfrequency down to baseband. When the FOG is rotating at a constant rate, the baseband signal (waveform 108) contains a DC component of approximately zero, and also spikes 109 at twice the eigenfrequency. These spikes represent a rotational rate bias error which must be removed or reduced to improve FOG accuracy.

For the phase nulling closed loop FOG illustrated in FIG. 1 to achieve steady state operation while rotating at a constant rate, the DC component of the integrator input must approach zero or the input's frequency spectrum contain primarily high frequency terms (e g., two times the coil's eigenfrequency) with a DC component approaching zero for sufficient attenuation by the integrator. This is required to reduce the effect at the integrator output due to the spikes 109.

Figure 4:
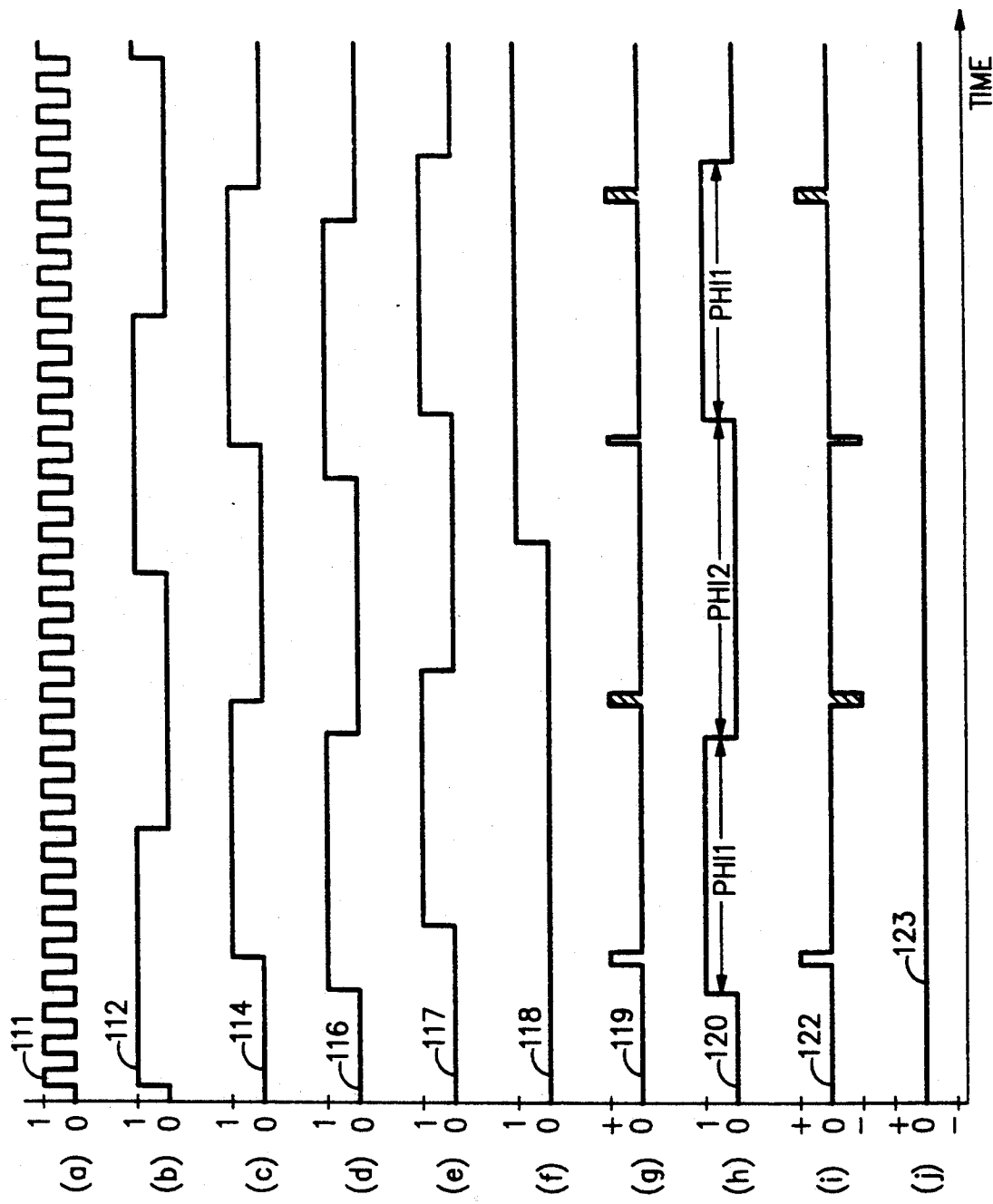
FIG. 4 is a timing diagram of select signals from FIG. 1 when there is no change in rotational rate and the phase dither technique is being used in the signal processing.

The apparatus of the present invention compensates for the spikes by adding phase dither to the demodulator reference signal. Referring to FIG. 4, illustrated are waveforms representative of various signals in the FOG of FIG. 1 when the FOG is rotating at a constant rate and with the apparatus of the present invention implemented therein. Waveform 111 (FIG. 4, illustration (a)) represents the oscillator output signal on the line 58. Waveform 112 (FIG. 4, illustration (b)) represents the output of the counter 60 at the eigenfrequency on the line 64. Waveforms 114-117 (FIG. 4., illustrations (c)-(e)) represent, respectively, the three output signals on the lines 32,66,68 from the shift register. The waveforms 114-117 are shifted by N, N−1 and N+1 clock cycles from waveform 112 respectively. Waveform 118 (FIG. 4, the line 72. Waveform 119 (FIG. 4, illustration (g)) illustrates the signal from the amplifier 48 on the line 50. Waveform 120 (FIG. 4, illustration (h)) is representative of the mux output signal on the line 54 with phase dithering in accordance with the present invention. The phase dithering is illustrated by waveform 120 where PHI1 and PHI2 are not equal.

Waveform 122 (FIG. 4, illustration (i)) represents the demodulator output on the line 76. The waveform 122 has a DC component of zero representing the zero rotational rate of change and also spikes due to the inherent imperfections in the modulating squarewave signal on the line 32. Note that spikes for the period illustrated in FIG. 4 illustration (i) are now equally distributed about a DC value so their net contribution is zero following integration as illustrated by waveform 123 (FIG. 4, illustration (j)). Hence, phase dithering has facilitated the reduction in the rate bias errors by transforming the spikes illustrated in FIG. 4, illustration (g) uniformly about a DC value representative of change in rotational rate, thereby allowing for the removal of the spikes by the integrator. Prior to the apparatus of the present invention, the net contribution of the spikes was non-zero since the crosshatched and noncrosshatched spikes were assumed to be of unequal area, thereby causing a rate bias error.

It should be understood that a slow first order (i.e. single pole) lag could be substituted for the integrator since the dynamic operation of the first order lag approaches that of an integrator when the break frequency of the lag is set to a low frequency. Also, in an open loop rotation sensor it may be desirable to use a single or multiple pole filter rather than an integrator. In FIG. 7 a Bode plot for the integrator 121A and a Bode plot for the slow first order lag 121B with a pole at $w_2$ are illustrated using the low frequency and high frequency asymptotes as approximations, demonstrating the known dynamic similarity between the integrator and a slow lag including the $-20$ dB/decade high frequency asymptote of each. FIG. 7 also illustrates a Bode plot for a three pole filter 121C, where all three poles are set at w providing a high frequency asymptote of $-60$ dB/decade. In the interest of clarity, the frequency axis of FIG. 7 has been normalized with respect to a certain frequency $w_1$.

Figure 5:
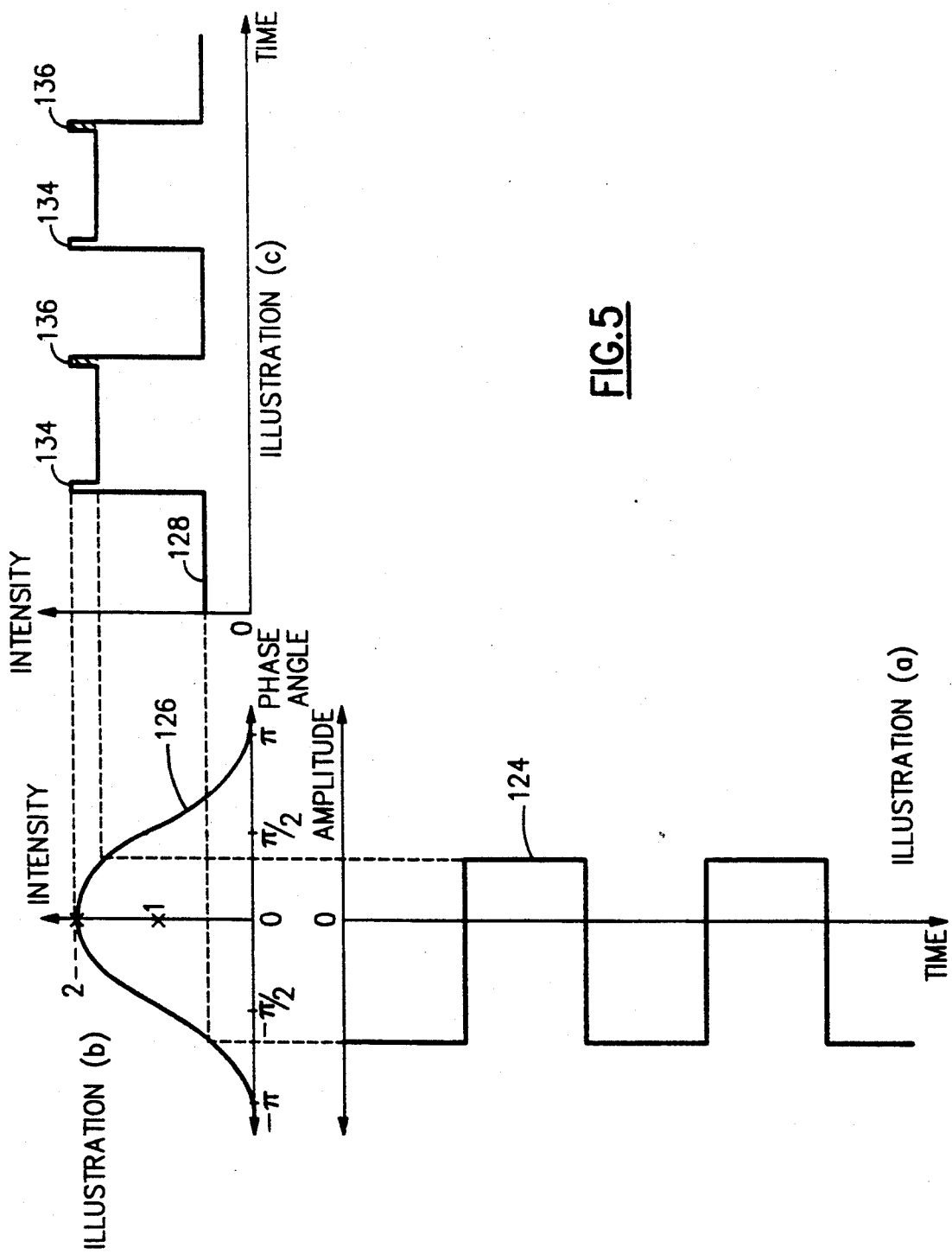
FIG. 5 is a graph of the intensity versus phase shift curve modulated by the squarewave carrier when there is a change in rotational rate.

Referring to FIG. 5, the effect of the phase dithering of the present invention is illustrated when the FOG undergoes a change in rotation rate. In FIG. 5 illustration (a), waveform 124 of the periodic squarewave signal on the line 32 has been shifted by the change in rotation rate. Thus, the squarewave is no longer equally biased about a DC amplitude value of zero. When waveform 124 modulates the intensity waveform 126 (FIG. 5, illustration (b)), the result is waveform 128 (FIG. 5, illustration (c)). The frequency spectrum of waveform 128 illustrating the amplifier output now contains a significant frequency component at the coil eigenfrequency. In contrast, the amplifier's output frequency spectrum did not contain a noticeable frequency component at the coil eigenfrequency (FIG. 2, illustration (c)) while the FOG was rotating at a constant rate.

Figure 6:
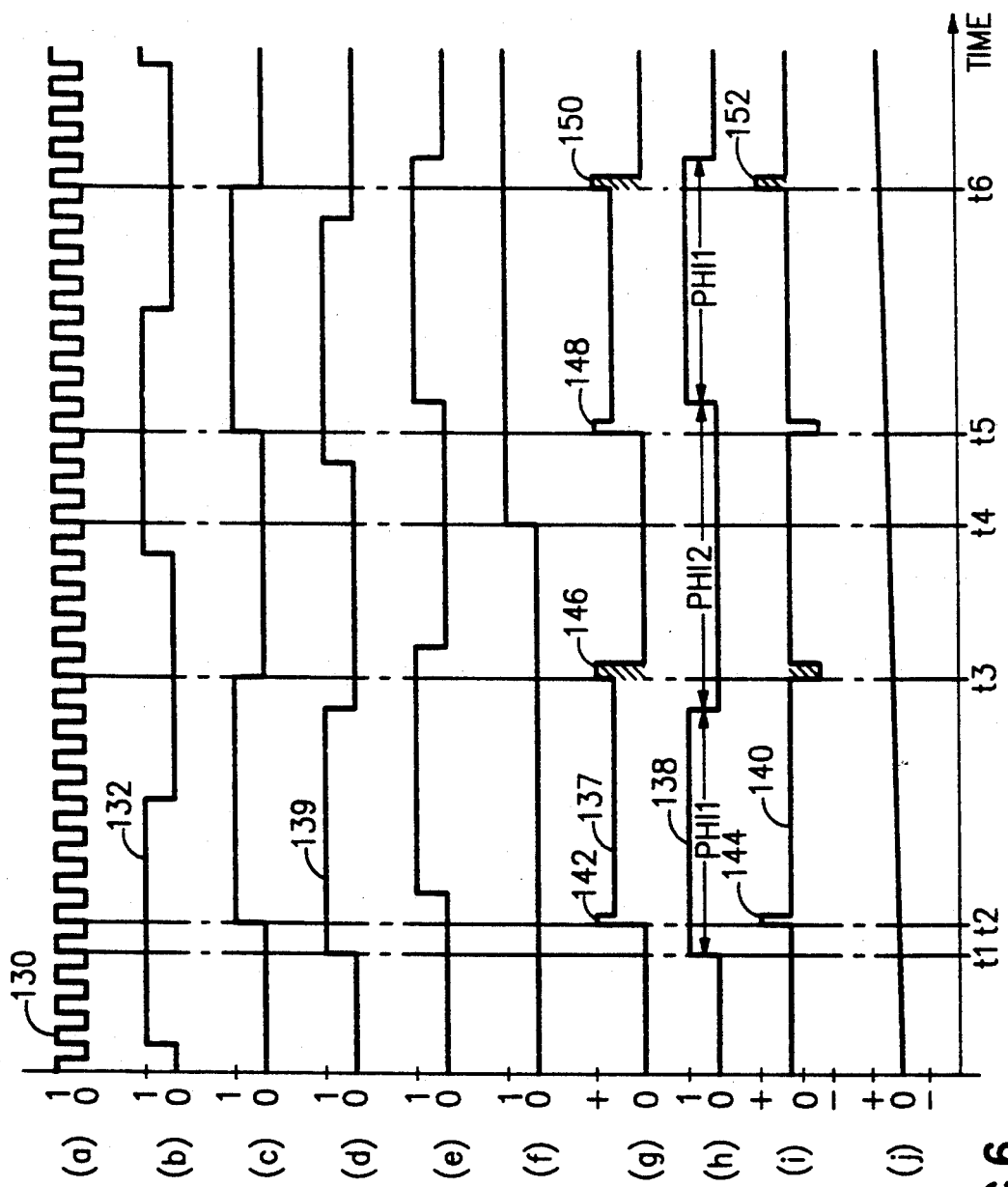
FIG. 6 is a timing diagram of select signals from FIG. 1 when there is a change in the rotational rate and the phase dither technique is being used in the signal processing.

Referring to FIG. 6, illustrated are waveforms representative of various signals in the FOG of FIG. 1 when the FOG is rotating with a constant non-zero acceleration and with the apparatus of the present invention implemented therein. The waveforms of FIG. 6, illustrations (a)-(f) are similar in all respects to the waveforms illustrated in FIG. 4, illustrations (a)-(f).

When the mux select signal (FIG. 6, illustration (f)) on the line 72 is logic low, the mux 70 selects the signal (FIG. 6 illustration (d)) on the line 66. When the mux select signal goes high at time t4, the mux 70 selects the signal (FIG. 6 illustration (e)) on the line 68. Waveform 138 (FIG. 6, illustration (h)) illustrates the mux output on the line 54 as result of these selections.

The frequency spectrum of the modulated rate signal on the line 50 (FIG. 5 illustration (c)) contains a frequency component at the eigenfrequency which represents the change in rotational rate. However, the waveform also contains unwanted spikes 134,136 at twice the eigenfrequency similar to when the FOG was rotating at a constant rate. The effect of the spikes must be sufficiently reduced to ensure they do not contribute unacceptable rate bias error terms. How this is performed by the apparatus of the present invention is best understood by illustrating the demodulation of each of the spikes.

The single stage demodulation of the modulated rate signal waveform 137 (FIG. 6, illustration (g)), and the demodulator reference signal with phase dithering (FIG. 6, illustration (h)), is illustrated by waveform 140 (FIG. 6, illustration (i)) which represents the demodulator output. It should be understood waveform 140 has been simplified in the interest of clarity to show only the DC term and the spikes resulting from the demodulation of waveform 137 by waveform 138. At time t1, the mux 70 is selecting waveform 139 (FIG. 6 illustration (d)), with the resulting mux output represented by waveform 138. At time t2, the spike 142 in the modulated rate signal is demodulated with waveform 138 to produce the corresponding spike 144 (FIG. 6, illustration (i)) in the demodulator output signal.

At time t3, the demodulator reference signal waveform 138 is a logic low. Thus, the spike 146 in the modulated rate signal at time t3 is demodulated in the negative direction. The spike 148 at time t5 is also demodulated in the negative direction since the demodulator reference signal remains at a logic low. The crosshatched spike 150 in the modulated rate signal at time t6 is demodulated to create spike 152 since the demodulator reference signal is now logic high.

Along with the non-zero DC component representative of the change in rotation rate, waveform 140 also contains spikes equally distributed about the non-zero DC value. However, the phase dithering of the present invention has uniformly placed the spikes about the non-zero DC value representing rotational acceleration. That is the DC contribution of the spikes has been removed via demodulation with a phase dithered reference signal and the subsequent integration of the demodulated signal.

Now when the demodulator output waveform 140 is integrated, the spikes are removed generating a ramp waveform 154 (FIG. 6, illustration (j)) on the line 80. Upon the completion of rotational acceleration, as the FOG 10 closes the loop by nulling out the phase shift generated by the rotation rate, the magnitude of the DC component of the demodulator output on the line 76 will decrease until it is virtually zero. This causes the slope of the integrator output to decrease until it eventually reaches zero. At this point the proper amount of phase bias is being added by the serrodyne modulator 86 to null out the phase shift induced by the rotation rate. Furthermore, the rate errors from the aforementioned carrier squarewave imperfections have been significantly reduced, and the signal processing has been simplified with a single stage demodulator It should be understood that the phase dither circuitry 30 described hereinbefore comprising an oscillator 56, counter 60, shift register 62 and multiplexor 70 is just one of many ways the functional requirements of generating the phase dithered demodulator reference signal may be met. Furthermore, the phase dither circuitry could be placed within an Application Specific Integrated Circuit (ASIC), such as a gate array, or built with standard medium scale and small scale integrated components. Also, instead of converting the modulated optical rate signal on a line 42 to an analog electrical signal, all the signal processing may be performed by converting to a digital signal in order to perform the signal processing with a microprocessor or state machine and its accompanying software or firmware.

The utility of this invention is also not limited to closed-loop phase nulling fiber optic rotation sensors as demonstrated hereinbefore. This invention will also reduce the rate bias errors due to imperfections of the carrier squarewave in a sensor operating open loop. Furthermore, it should be understood that this invention is not limited to fiber optic rotation sensors which contain an integrated optic (IO) device since the function of the IO device may be performed with discrete components.

Although the present invention has been shown and described with respect to a best mode embodiment thereof, it should be understood by those skilled in the art that various other changes, omissions, and additions to the form and detail thereof, may be made therein without departing from the spirit and scope of the invention.

I claim:

1. A fiber optic rotation sensor, comprising:
   a light source emitting a light beam;
   a splitter to separate said light beam into two beams;
   a fiber optic coil having said two beams counterpropagating therein and subsequently recombining at the output of said coil into a recombined optical signal, the intensity of said recombined optical signal being indicative of rotation rate;
   phase dither generator means, for providing a periodic squarewave carrier signal at a certain frequency, and for providing a demodulator reference signal phase dithered uniformly about the phase of said carrier signal;
   dynamic bias modulator means, for modulating said counterpropagating beams with said carrier signal;
   detector means, for converting the intensity of said recombined optical signal into a signal indicative thereof;
   a coupler to direct said recombined optical signal to said detector means;
   demodulator means, for demodulating said detector output signal with said demodulator reference signal, and for providing a demodulated signal indicative thereof; and
   dynamic means, for removing non-DC frequency components contained in the frequency spectrum of said demodulated signal and for providing a filtered signal indicative thereof.

2. The sensor of claim 1, wherein said dynamic bias modulator means comprises a solid state optical phase modulator having electrodes excited by said carrier signal.

3. The sensor of claim 1, wherein said phase dither generator means further comprises:
   means for generating a periodic squarewave signal having a frequency at or above said certain frequency of said carrier signal;
   signal divider means, for dividing said periodic squarewave signal down to said certain frequency;
   phase shift means, for generating said carrier signal, and for shifting the phase of said periodic squarewave signal uniformly about the phase of said carrier signal for generating a signal in phase lead with respect to said carrier signal and a signal in phase lag with respect to said carrier signal;
   control means, for providing a two level signal with frequency components less than said certain frequency but greater than the closed loop bandwidth of the sensor; and
   selection means, responsive to said two level signal, for selecting either said phase lead signal or said phase lag signal to appear at an output of said selection means.

4. The sensor of claim 1, wherein the value of said certain frequency is the value of the eigenfrequency of said coil.

5. The sensor of claim 1, further comprising:
   ramp generator means, for generating a bipolar sawtooth or staircase waveform signal having a polarity and frequency as a function of said filtered signal; and
   serrodyne modulator means, for adding phase bias to said counterpropagating beams in an amount in response to said bipolar signal, said amount of phase bias being added so as to null out the phase shift induced by any rotation of said coil about an axis normal thereto.

6. The sensor of claim 1, further comprising:
   a polarizer for signal conditioning of said light beam emitted from said light source and for signal conditioning of said recombined light beam.

7. The sensor of claim 1, wherein said dynamic means is characterized by a Bode plot comprising a maximum high frequency asymptote slope of $-20$ dB/decade.

8. The sensor of claim 1, wherein said dynamic means comprises an integrator.

9. A fiber optic rotation sensor in which light beams counterpropagating in an optical waveguide loop are modulated by a squarewave carrier signal operating at a certain frequency, the beams are combined at the loop output, a combined optical signal indicative of the combined beams being a modulated signal having spikes at a frequency of twice the certain frequency due to imperfections of the carrier signal, the modulated signal is coupled to and transformed by a detector to an electrical modulated signal, comprising:
   dither means, for providing a squarewave reference signal whose phase is dithered uniformly about the phase of the carrier signal; and
   demodulator means, for demodulating the electrical modulated signal with said squarewave reference signal, and for generating a demodulated signal with a DC value indicative of any rate of rotation of the sensor, said demodulated signal retaining any of the spikes due to said imperfections but having the spikes positioned about said DC value such that the spikes contribute no DC error component to said DC term indicative of said rotation rate.

10. The sensor of claim 9, further comprising:
    dynamic means, responsive to said demodulated signal, for removing the spikes therefrom as a result of said demodulating of the modulated signal, and for providing a filtered signal indicative thereof.

11. The sensor of claim 10, wherein said dynamic means comprises an integrator.

12. The sensor of claim 9, wherein said certain frequency is the eigenfrequency of the sensor.

13. The sensor of claim 10, further comprising:
    ramp generator means, for generating a bipolar sawtooth or staircase waveform signal having a polarity and frequency as a function of said filtered signal; and
    serrodyne modulator means, for adding phase bias to the counterpropagating beams in an amount in response to said bipolar signal, said amount of phase bias being added so as to null out the phase shift induced by any rotation of the loop about an axis normal thereto.

14. The sensor of claim 10, wherein said dither means further comprises:
    means for generating a periodic squarewave signal having a frequency at or above said certain frequency of said carrier signal;
    signal divider means, for dividing said periodic squarewave signal down to said certain frequency;
    phase shift means, for generating said carrier signal, and for shifting the phase of said periodic squarewave signal uniformly about the phase of said carrier signal for generating a signal in phase lead with respect to said carrier signal and a signal in phase lag with respect to said carrier signal;
    control means, for providing a two level signal with frequency components less than said certain frequency but greater than the closed loop bandwidth of the sensor; and selection means, responsive to said two level signal, for selecting either said phase lead signal or said phase lag signal to appear at an output of said selection means.

15. The sensor of claim 10, further comprising:
a polarizer to ensure the polarization of said light beams counterpropagating within said optical waveguide loop.

* * * * *